United States Patent [19]

Greenwell

[11] Patent Number: 4,874,067
[45] Date of Patent: Oct. 17, 1989

[54] AUTOMATIC CHANGEOVER FOR CARTONERS

[75] Inventor: Joseph D. Greenwell, Florence, Ky.

[73] Assignee: R. A. & Co. Inc. Jones, Covington, Ky.

[21] Appl. No.: 116,165

[22] Filed: Nov. 3, 1987

Related U.S. Application Data

[62] Division of Ser. No. 928,526, Nov. 7, 1986, Pat. No. 4,718,540.

[51] Int. Cl.$^4$ .................. B60K 41/26; B65G 15/20
[52] U.S. Cl. ..................... 192/4 R; 74/640; 198/627
[58] Field of Search .......... 192/4 R; 74/640; 198/627, 502.3, 810

[56] References Cited

U.S. PATENT DOCUMENTS

| | | | |
|---|---|---|---|
| 3,311,766 | 3/1967 | Scott | 74/640 X |
| 3,487,722 | 1/1970 | Cline | 74/640 X |
| 4,718,540 | 1/1988 | Greenwell | 198/627 |
| 4,756,203 | 7/1988 | Matsuda | 74/640 X |

FOREIGN PATENT DOCUMENTS

| | | | |
|---|---|---|---|
| 0131280 | 10/1979 | Japan | 198/627 |
| 0190105 | 10/1984 | Japan | 198/627 |
| 0839915 | 6/1981 | U.S.S.R. | 198/810 |
| 914312 | 1/1963 | United Kingdom | 74/640 |
| 2092982 | 8/1982 | United Kingdom | 198/627 |

Primary Examiner—Rodney H. Bonck
Attorney, Agent, or Firm—Wood, Herron & Evans

[57] ABSTRACT

A cartoner having a main drive and elements such as transport lugs, product bucket elements that are adjustable to accommodate different sizes of cartons. The disclosure is directed to automatic means for varying the positions of those elements automatically using the power of the main drive to accomplish the adjustment.

4 Claims, 5 Drawing Sheets

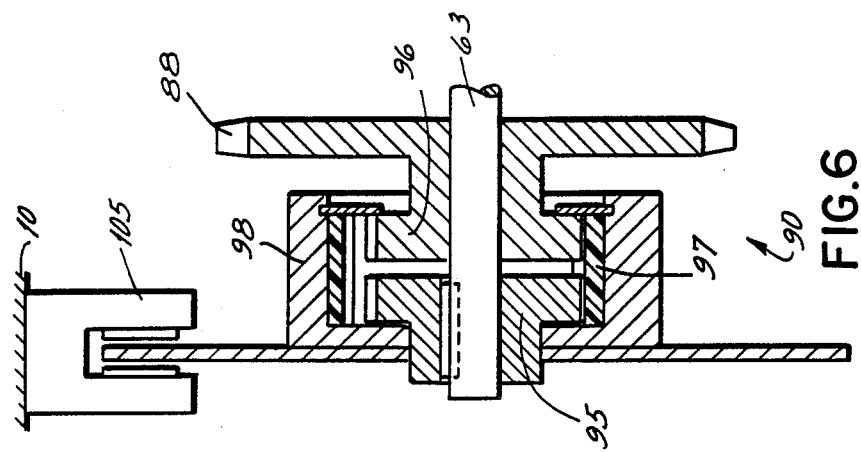
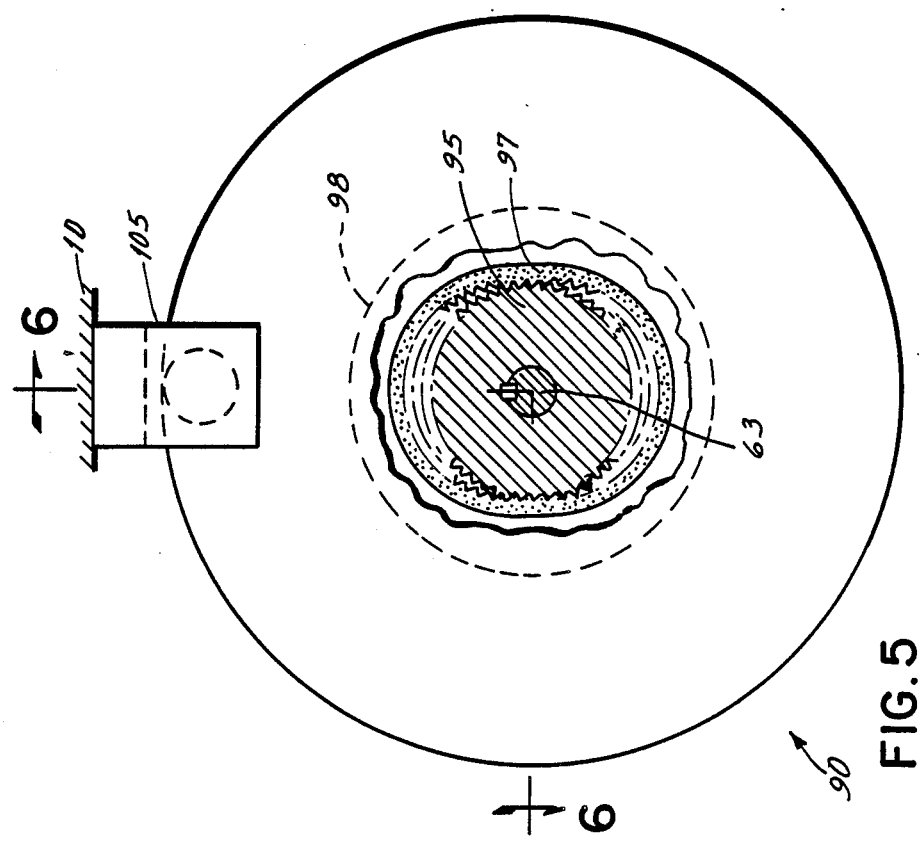

AUTOMATIC CHANGEOVER FOR CARTONERS

This is a division of application Ser. No. 06/928,526, filed Nov. 7, 1986 and now U.S. Pat. No. 4,718,540.

This invention relates to a cartoner and, more particularly, to apparatus for automatically changing a cartoner over from one size of carton to another.

BACKGROUND OF THE INVENTION

A cartoner normally contains a magazine for receiving a supply of flat folded carton blanks and apparatus for ejecting those carton blanks from the magazine and erecting them into a generally rectangular cross section tubular form. The cartoner has endless chains, one set carrying leading transport lugs and the other set carrying trailing transport lugs. The erected cartons are placed between the transport lugs and are held there for the cartoning operation. The cartoner also contains product buckets including leading and trailing elements which, together, create a support for the product to be loaded into the cartons. The product buckets move in alignment with the transport lugs so that the product may be thrust from the product buckets into the cartons carried by the transport lugs. A barrel loader is provided and carries reciprocating arms which thrust the product from the product buckets into the cartons. Movable elements are provided to manipulate the carton flaps to open and close them. A main drive is provided by the cartoner and all of the carton elements run in synchronism off the main drive.

Cartoners are usually employed in such a way as to require relatively frequent changeover to permit the running of different sizes of cartons and products. In the changeover process, mechanics use wrenches to unloosen parts. The mechanics shift the parts relative to some datum associated with the main drive and retighten the parts to fix them in that position. For example, the chains carrying the trailing lugs in the transport conveyor maintain a fixed relationship to the main drive. The chain carrying the leading lug is manually and physically shifted with respect to the chain carrying the trailing lugs so as to accommodate cartons of greater or lesser length (the length being the dimension in the machine direction). Similarly, the elements forming the product buckets are shifted with respect to each other. The elements which engage the flaps must be shifted to accommodate different flap positions. The foregoing are the cyclically rotational parts to which the present invention is particularly directed. Additionally, there are linearly-adjusted elements such as the magazine sides, the side rails through which the cartons pass and the like. These, too, are loosened, shifted and tightened to fix them in position.

A minimum of about two hours is required for the complete manual adjustment of parts involved in a changeover. The quality of that adjustment depends significantly on the care and quality of the mechanic performing the changeover operation. Once all of the adjustments have been made, a trial run is performed and usually considerable fine tuning of the adjustments is required, the amount of fine tuning being dependent upon the care with which the original adjustments were made. The complete changeover process may take as long as twenty-four hours.

SUMMARY OF THE INVENTION

An objective of the present invention has been to provide for automatic changeover in less than five minutes.

Another objective of the invention has been to provide the capability of fine tuning a changeover "on the fly", that is, while the machine is running. For example, if the machine is set to run a particular product and carton size, it is possible that the delivered cartons may be dimensionally different from a previous run and do not handle as well. But being able to adjust the transport lugs with respect to each other as well as other adjustable moving parts while the machine is running is a significant advantage. It enables the operator to make the adjustment while observing the improvement in the operation as it takes place.

The objects of the invention are attained by connecting the elements to be adjusted to the main drive through one or two phase variators. One such phase variator is the INFINIT-INDEXER ®, manufactured by Harmonic Drive Division, Emhart Machinery Group, 51 Armory St., Wakefield, Mass. 01880. A phase variator is a differential gear drive mechanism wherein all gear elements are normally locked together for direct drive. However, on applying a locking force or a driving force to one of the elements the gears will drive the element to be adjusted slowly with respect to a reference point.

In conjunction with the phase variators, the invention provides a computer into which the desired positions are stored, a reference position encoder connected to the computer and a shaft position sensing mechanism connected to the computer which senses the position of the element to be adjusted. With these components of the system, the desired position is entered in the computer and one of the phase variators connected in the drive to the adjustable element is operated to effect the movement of the element to be adjusted to the desired position as set in the computer. The movement of the element and its adjustment occurs through the power provided by the main drive while the cartoner is running. If it is desired to fine tune the adjustment, that can be done while the cartoner is running so that the operator can observe the effect of the fine tuning adjustment on the operation of the cartoner.

Some elements can be adjusted using a single unidirectional phase variator as long as there is no interference by other parts of the cartoner machinery to the continued movement of the element to be adjusted in a single direction. Since some of the elements, such as the adjustable elements in the product bucket conveyor, cannot be moved completely unidirectionally without interference, it is necessary to provide bidirectional adjustment. This is accomplished through the use of two phase variators in the drive to the respective element.

BRIEF DESCRIPTION OF THE FIGURES

The several features of the invention will become more readily apparent from the following detailed description taken in conjunction with the accompanying drawings in which:

FIG. 5 is a diagrammatic side elevational view of a phase variator;

FIG. 6 is a cross-sectional view taken along lines 6—6 of FIG. 5;

GENERAL ORGANIZATION AND OPERATION

Figure 1:
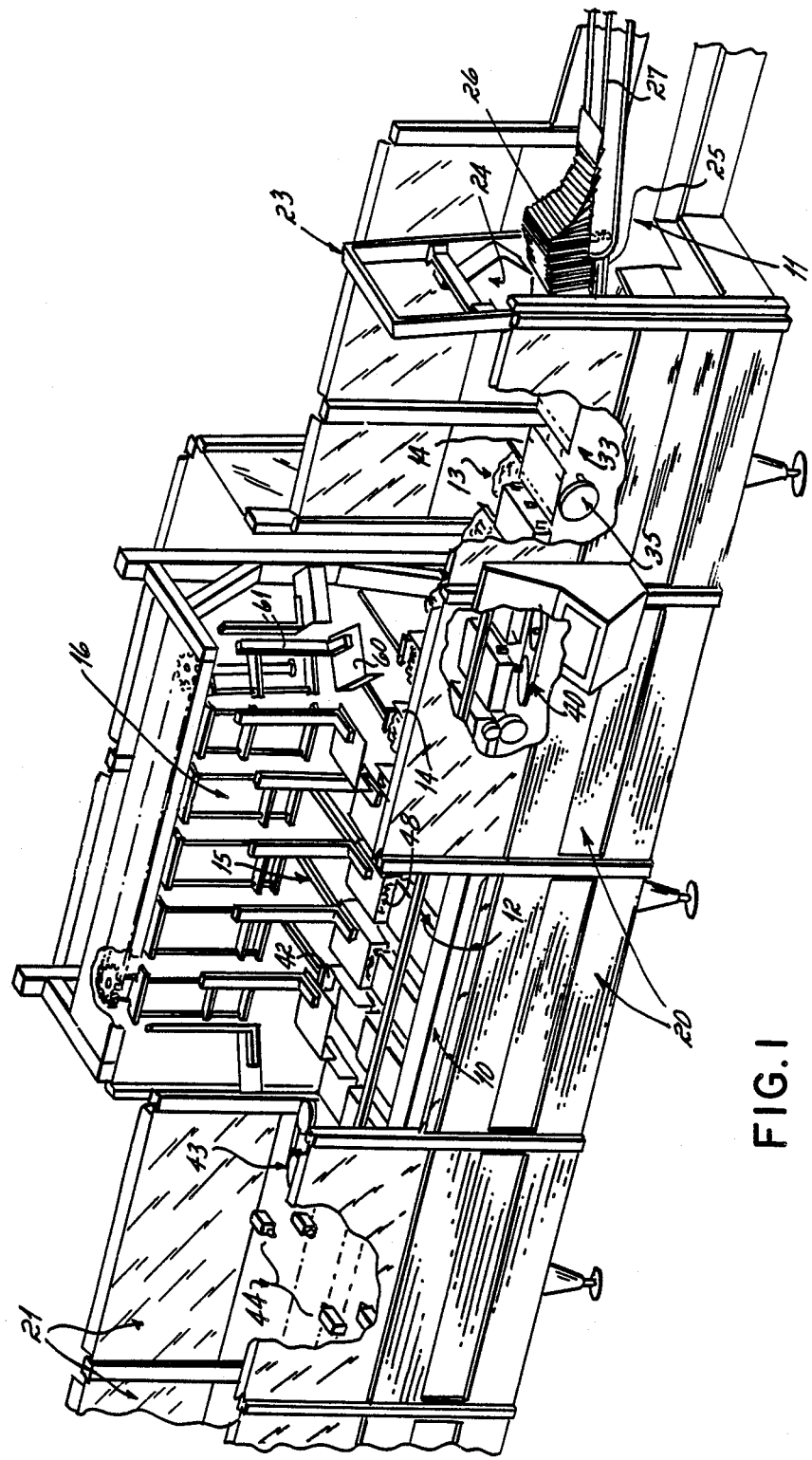
FIG. 1 is a perspective view of a cartoner.

A cartoner with which the present invention is employed includes a frame 10 which supports the principal operating elements. The frame supports a carton feeder 11, a carton transport conveyor 12, a product bucket conveyor 13 and product buckets 14 mounted on the conveyor and a barrel loader 15. An overhead tamper confiner 16 is employed for product which must be compressed either vertically or horizontally or both in order to size them for introduction into the cartoner.

The cartoner is surrounded by a series of lower opaque guard panels 20 and guard windows 21 which are capable of being raised and lowered to expose the operating components of the machine for repairs, unclogging jams and the like.

In somewhat more detail, the feeder 11 has a frame 23 which supports a rotatable feed mechanism 24 of the type disclosed in U.S. Pat. No. 4,429,864. The feeder also includes a pair of spaced parallel downstream chains 25 on which flat folded cartons 26 are supported and gradually moved toward the rotary feeding device.

The carton transport conveyor 12 has three elongated, parallel endless chains. The outboard chains 29 support trailing transport lugs 30. The center chain 31 supports a leading transport lug 32. The center chain may be shifted with respect to the outboard chains in order to vary the spacing between the leading and trailing transport lugs in order to accommodate cartons of differing lengths (the length of the carton is the dimension in the machine direction). The cartons are fed in the flat folded condition onto the transport conveyor. Prior to being captured between the leading and trailing transport lugs of the conveyor 12, the carton is transported from the feeder by a conveyor 33. During the traverse of conveyor 33, the carton flaps are separated by a flap separator 35 which forces a lower flap downwardly into a position where it can be engaged by a stationary plough and turned and held at a 90° angle to the wall to which it is connected. The carton then moves through an air opener 36 which directs blasts of air from either side of the carton in a horizontal direction to force air between the upper and lower walls of the carton, thereby causing the carton to swing to an erect orientation between the leading and trailing lugs of the transport conveyor. That air opener is disclosed in U.S. Pat. No. 3,728,945, issued Apr. 24, 1973.

Immediately downstream of the air opener are opposed flap spreaders 40. The flap spreaders carry lugs 41 which engage the leading flap of the carton and swing it through 90° so that it can be captured by stationary rails and held in that attitude as the carton passes the barrel loader 15. The trailing flap is similarly captured by the rails and held open.

As the carton passes the barrel loader, pusher heads 42 engage products in the product buckets and thrust them across the product buckets into the opened cartons.

After the carton has been filled, it is conveyed past flap closers 43 which engage the trailing flaps and swing them to a closed position. Glue guns 44 are mounted alongside the carton conveyor downstream of the flap closers 43. The glue guns apply an appropriate pattern of glue to one of the horizontal flaps of the carton. When the glue is applied, ploughs swing the horizontal flaps to a closed position and hold them there during the brief period required for the glue to set.

Figure 3:
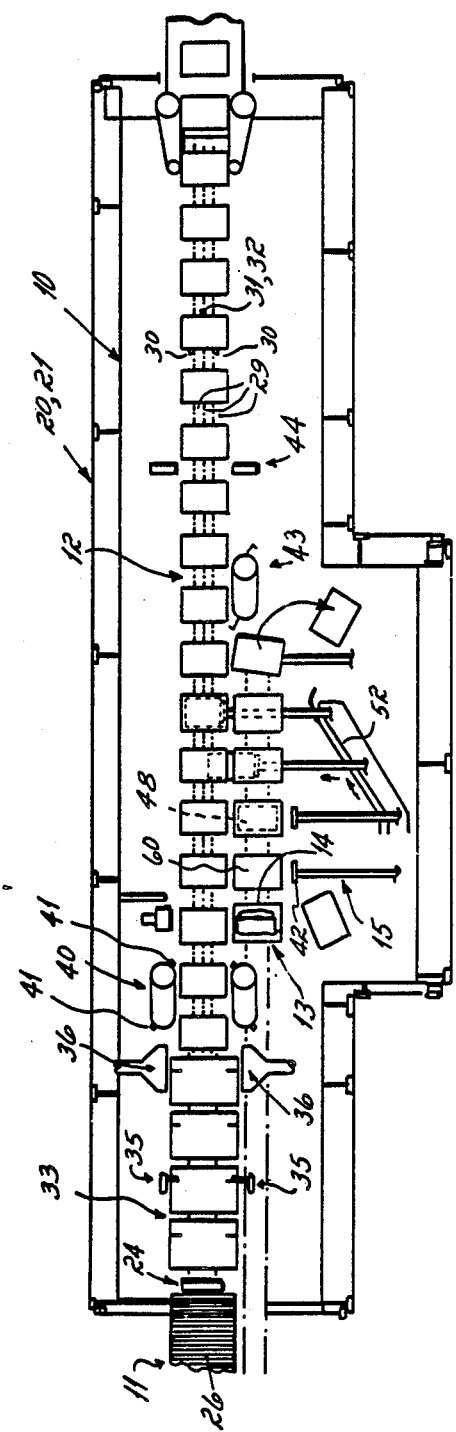
FIG. 3 is a diagrammatic top plan view of the cartoner.
Figure 2:
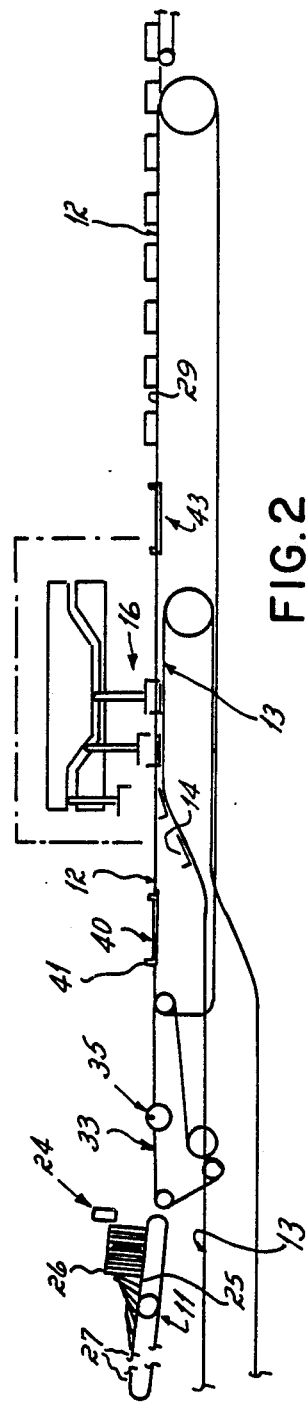
FIG. 2 is a diagrammatic side elevational view of the cartoner.
Figure 4:
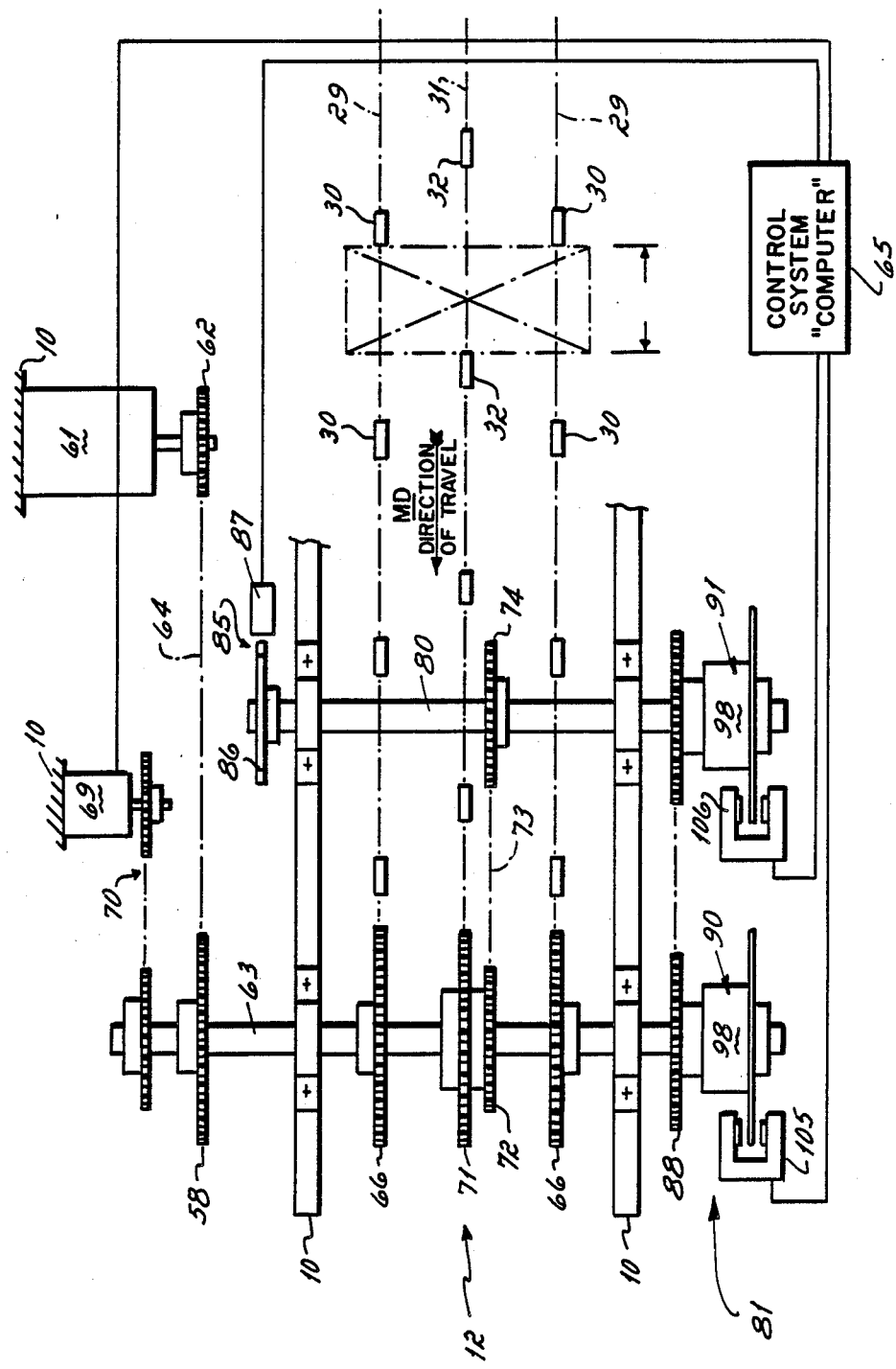
FIG. 4 is a diagrammatic plan view of a portion of the transport conveyor.

The product bucket conveyor 13 consists of a pair of endless chains which support a series of spaced product buckets 14 which convey products 48 past the open cartons. The product buckets may be L-shaped as shown, or may be U-shaped depending upon the product to be filled into the carton and the need for imparting shaping to the product to enable it to conform dimensionally to the size of the carton. The size of the product bucket can be varied by adjusting the two chains relative to each other in accordance with the present invention. The barrel loader 15 diagrammatically illustrated in FIG. 3 consists of a series of pusher heads 42 which are slidably supported on endless chains. The pusher heads have cam followers which ride in a cam track 52. As the pusher heads are conveyed on the upper run of the chains which support them, the cam track 52 causes each pusher head to move across the product bucket where it engages the product 48 and thrusts it into an open carton.

In the operation of the cartoner, the flat folded carton blanks are fed from the feeder 24 toward the transport conveyor. The upper and lower flaps of the carton are separated so as to permit air to be introduced between the upper and lower walls of the carton. At the air opener 36, blasts of air erect the carton between the leading and trailing transport lugs. As the cartons move downstream, the horizontal flaps are plowed up and down and the vertical flaps are swung through 90° on both sides of the carton to prepare the carton for the introduction of product.

Product which has been transferred to the product buckets is confined by the overhead tamper confiner 16 as the products pass the barrel loader 15. There, the pusher heads 42 of the barrel loader drive each product across the product bucket and into the carton opposite it as the product buckets and transport conveyors move alongside each other past the barrel loader.

After the product has been loaded into the cartons, the carton flaps have a pattern of glue applied to them and are closed and held in a closed condition until the glue sets.

The cartoner has a main drive motor 61 which is connected through a sprocket 62 and chain 64 to a sprocket 58 on a drive shaft 63 for the transport conveyor. The main drive motor 61 is also connected to the product bucket conveyor, the carton feed system, the flap spreaders and the flap closers and the other operating elements so that all elements operate in synchronism. It is to be understood that when adjustment is to be made to change the cartoner over to a different size carton, most, if not all, of the moving elements will require some adjustment. The amount of adjustment will be set into a computer or control system 65.

The manner in which automatic adjustment is effected will be described in reference to the transport conveyor 12. It should be understood that all of the other moving elements of the cartoner that need to be adjusted will be adjusted in substantially the same way. The linearly-adjusted elements such as the magazine side guides, the cartoner side guides, the glue gun positions are adjusted much more simplistically. In the case of those elements, each has associated with it a position transducer and a motor for moving it linearly. The desired positions of the respective elements are introduced into the computer 65. When adjustment is to be made, the desired position is entered into the computer, the position transducers sense the elements are out of proper position and cause the motors to operate until the elements have been moved linearly to the desired positions. When the desired positions are achieved, the motors are deenergized.

The drive shaft 63 for the transport conveyor carries two driving sprockets 66 which in turn carry the two outboard chains 29 which carry trailing transport lugs 30. The position of the transport lugs with respect to the main drive will be fixed and for the present purposes form a convenient reference point. Any reference point fixed with respect to the main drive system can be used as well. A shaft position encoder 69 is connected by a chain and sprocket drive 70 to the shaft 63 and is driven thereby in synchronism with the main drive motor 61. The shaft position encoder connected to computer 65 always reflects the position of a reference element such as the trailing lugs 30.

The leading lugs 32 are mounted on the center chain 31 which passes over a sprocket 71. The sprocket 71 is fixed to a driving sprocket 72 which is in turn connected by a chain 73 to a sprocket 74 fixed on a shaft 80. The shaft 80 which drives the center chain 31 and leading transport lugs 32 is driven through a phase adjusting system 81 by the drive shaft 63 for the trailing transport lugs. In normal operation, the shaft 63 and the shaft 80 are driven together on a one-to-one relationship. The phase adjusting system is provided to effect the linear adjustment of the center chain with respect to the outside chains, thereby adjusting the spacing between the leading and trailing transport lugs to accommodate different sizes of cartons.

The shaft 80 carries a position indicator 85 which includes a disk 86 having a registration spot thereon and an electric eye 87. Clearly, any type of sensor such as a magnetic sensor could be employed. That sensor is connected to the computer 65 to feed into the computer a signal indicating the position of the element, in this case the leading lug, relative to the reference position monitored by the indicator 85. The operation of the position adjusting system can best be understood by reference to FIGS. 5 and 6.

The system 81 has two identical phase variators 90 and 91, the phase variator 90 being shown in FIGS. 5 and 6. The phase variator 90 has a driving gear 95 which is keyed to the shaft 63. A driven gear 96 is fixed to the sprocket 88 that is connected to the shaft 80 through the second phase variator 91. An intermediate flexible internal ring gear member 97 is in meshing engagement with the gears 95 and 96. The flexible internal gear 97 is normally maintained in a fixed relationship to a housing 98 but is adapted to rotate with respect to it when the housing 98 is fixed. The gears 95 and 96 have differing numbers of teeth; for example, the gear 95 may have 200 teeth and the gear 96 has 202 teeth.

In normal operation, there is a fixed relationship among all gears so that they rotate together and provide a direct drive to the shaft 80 which carries the leading transport lug. If the position of the transport lug is to be changed, the housing 98 is held in a fixed relation to the cartoner frame by a disk brake assembly 105. When the housing 98 is fixed, the gear 95 drives the internal gear 97 with respect to the housing 98. The gear 97 in turn drives the gear 96 but at a slightly slower rate than the gear 97. Thus, there is a gradual retarding of the leading transport lug 32 with respect to the trailing transport or reference lug 30.

As indicated above, the phase variator 91 is identical to the phase variator 90 except that its operating relationship is reversed. When the brake assembly 106 blocks movement of the housing 98 of the variator 91, the driven gear will rotate more rapidly than the driving gear. In other words, the driving gear will have 202 teeth and the driven gear will have 200 teeth. The driven gear will therefore advance the leading transport lug with respect to the reference or trailing lug of the transport conveyor. In both operations, the power to effect the movement of the lugs comes from the main drive for the cartoner and is accomplished while the cartoner is being driven by the main drive motor 61.

This feature of the invention permits not only an adjustment of moving elements with respect to reference points without the use of auxiliary motors, but additionally permits the fine tuning adjustment of those movable elements during an actual cartoning operation. For example, in a situation where delivered cartons are slightly out of tolerance and may be running imperfectly, the operator may see that the transport lugs, for example, should be closed or opened with respect to each other and by tweaking the computer system can effect that change "on the fly" or while the machine is running.

It should be understood that while the invention has been described in connection with the holding of the housing for the internal ring gear, it should be understood that it would be possible, although considerably more complex, to drive the housing for the internal ring gear thereby causing a relative rotation of the driven gear with respect to the driving gear and an adjustment of the position of the leading lug with respect to the trailing lug.

It should also be noted that adjustment can be made while the cartoner is at rest simply by rotating the housing 98.

Figure 7:
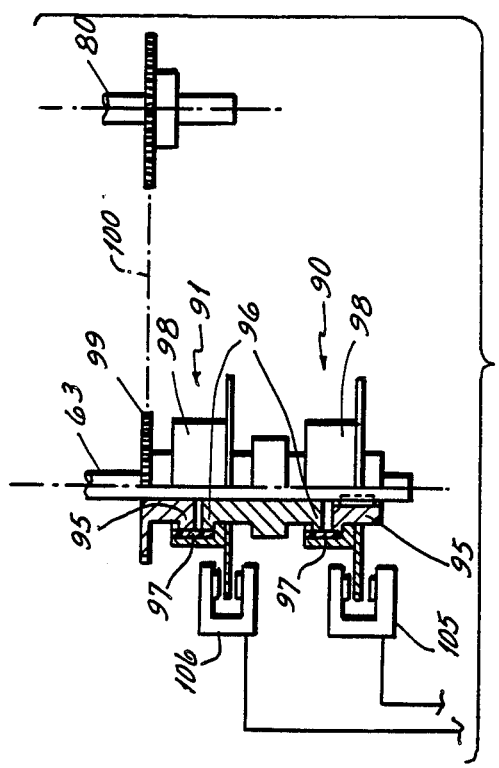
FIG. 7 is a diagrammatic view of a first alternative embodiment.

A similar adjustment can be effected by the adjusting system shown in FIG. 7. There, the two phase variators are connected in series as follows: the variator 90 has its driving gear 95 keyed to the end of the shaft 63. The shaft 63 is freely rotatable with all of the rest of the gear elements of the variators 90, 91.

The driven gear 96 of phase variator 90 is fixedly-connected to the gear 96 (202 teeth) of variator 91. Gear 95 of variator 91 is fixed to a sprocket 99 which is drivingly-connected through a chain 100 to the shaft 80 for the leading transport lug. In the adjustment operation, the housing of the variator 90 is held in fixed relationship. The gear 95 with 200 teeth will drive the gear 96 with 202 teeth through the internal ring gear 97. The shaft 80 will thus be driven slightly more slowly than the shaft 63 thereby causing the leading lug 32 to retard with respect to the trailing transport lug 30. For the reverse operation, the brake is applied to the variator 91. The gear 96 with 202 teeth will drive the gear with 200 teeth through the internal ring gear 97 thereby causing the shaft 80 to move slightly faster than the shaft 63 thereby causing the trailing lug to advance with respect to the trailing lug.

Figure 8:
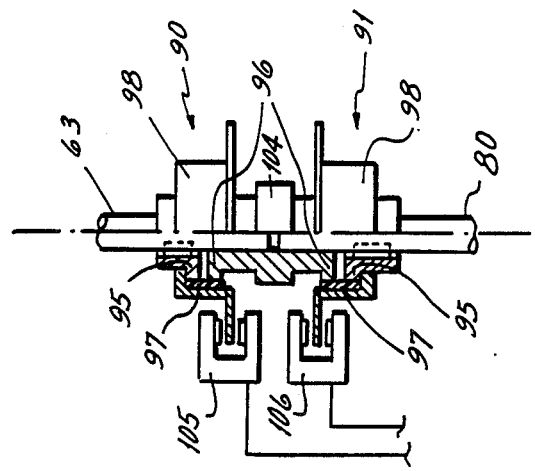
FIG. 8 is a diagrammatic view of a second alternative embodiment.

A phase adjusting system for coaxial shafts is shown in FIG. 8. In that embodiment, a shaft 63 is to drive a shaft 80. A phase variator 90 is connected in tandem to a phase variator 91. The shaft 63 is keyed to the gear 95 having 200 teeth. The gear 96 having 202 teeth is connected by a coupling 104 to a similar gear 96 on the variator 91.

The gear 95 of variator 91 is then keyed to the shaft 80 to drive it. Brakes 105 and 106 are employed as before in order to fix the housings 98 with respect to the cartoner frame to effect an adjustment. In this embodiment, the shaft 63 is normally driven in synchronism with the coaxial shaft 80. The gears in the variators 90 and 91 are locked together so that there is no relative movement. When a brake 105 is applied to the housing 98 of the variator 90, the gear 95 with 200 teeth will drive the gear 96 with 202 teeth. Thus, the shaft 63 will drive the shaft 80 slightly more slowly than the shaft 63 thereby effecting a phase adjustment of the shaft 80 to retard the element which it carries with respect to a reference point on the shaft 63. Conversely, if the shaft 80 is to be advanced, the brake 106 on the variator 91 is applied. The fixing of the housing 98 on the variator 91 causes the driving gear 96 to drive the driven gear 95 (with 200 teeth) somewhat more rapidly than the gear 96. Thus, the shaft 80 will drive more rapidly than the shaft 63 causing an advance of the element connected to the shaft 80.

The Program Ladder Listing that is preferred for the operation of the control system computer 65 has been filed as an appendix to parent application Ser. No. 06/928,526, filed Nov. 7, 1986.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

Having described my invention, I claim:

1. In a cartoner having a frame, a main drive, and at least one operating element connected to said main drive to be driven in synchronism with said main drive, a mechanism for varying the position of said element with respect to a reference position on said main drive comprising,
    a phase variator connected between said main drive and said element,
    said phase variator having a housing, a driving gear, a driven gear and an intermediate gear interconnecting the driving and driven gears, all said gears normally having no relative rotation, thereby functioning as a rigid drive coupling,
    said gears being rotatable with respect to said housing when said housing is blocked against rotation,
    a brake fixed to said cartoner frame and engageable with said variator to block movement of the housing to force relative movement of the driving and driven gears, thereby causing said element to shift its relationship with respect to the said reference position,
    a computer,
    means connected to said computer for detecting the position of said element with respect to said reference position,
    means for setting in said computer a desired position for said element,
    and means for effecting release of said brake when said desired phase position is achieved.

2. In a cartoner having a frame, a main drive for driving said cartoning machine in one direction and at least one operating element connected to said main drive to be driven in synchronism with said main drive, a mechanism for varying the position of said element with respect to said main drive comprising,
    a first and second phase variator connected between said main drive and said element,
    each said phase variator having a housing, a driving gear, a driven gear and an intermediate gear interconnecting the driving and driven gears, all said gears normally having no relative rotation thereby functioning as a rigid drive coupling,
    said gears being rotatable with respect to said housing when said housing is blocked against rotation,
    a first brake fixed to said cartoner frame and engageable with said first variator to block movement of the housing while said main drive is operating, thereby causing said element to advance with respect to other synchronously-driven elements of said cartoner,
    a second brake fixed to said cartoner frame and engageable with said second variator to block movement of its housing while said main drive is operating, thereby causing said element to retard with respect to other synchronously-driven elements of said cartoner,
    a computer,
    means connected to said computer for detecting the position of said element with respect to the other synchronously-driven elements,
    means in said computer for setting a desired position for said element,
    and means for effecting release of said brake when said desired position is achieved.

3. In a cartoner having a frame, a main drive, and at least one operating element connected to said main drive to be driven in synchronism with said main drive, a mechanism for varying the position of said element with respect to a reference position on said main drive comprising,
    a phase variator connected between said main drive and said element,
    said phase variator having a housing, a driving gear, a driven gear and an intermediate gear interconnecting the driving and driven gears, all of said gears having no relative rotation, thereby functioning as a rigid drive coupling,
    means utilizing the main drive of said cartoner for forcing relative movement of the driving and driven gears, thereby causing said element to shift its relationship with respect to said reference position,
    a computer,
    means connected to said computer for monitoring the position of said element with respect to said reference position,
    means for setting in said computer a desired position for said element,
    and means for deactivating said forcing means when said desired position is achieved.

4. In a cartoner having a frame, a main drive, and at least one operating element connected to said main drive to be driven in synchronism with said main drive, a mechanism for varying the position of said element with respect to a reference position on said main drive comprising, a phase variator connected between said main drive and said element, said phase variator having a housing, coaxial driving and driven gears within said housing, a flexible internal ring gear within said housing surrounding and in mesh with said driving and driven gears, one of said driving and driven gears having slightly more teeth than the other, said driving gear being connected to said main drive and said driven gear being connected to said operating element, said gears being rotatable with respect to said housing when said housing is blocked against rotation, a brake fixed to said cartoner frame and engageable with said variator housing to block movement of the housing to force relative movement of the driving and driven gears, thereby causing said element to shift its relationship with respect to the said reference position, a computer, means connected to said computer for detecting the position of said element with respect to said reference position, means for setting in said computer a desired position for said element, and means for effecting release of said brake when said desired phase position is achieved.

* * * * *